(12) United States Patent
Sagiya

(10) Patent No.: US 7,319,488 B2
(45) Date of Patent: Jan. 15, 2008

(54) DIGITAL CAMERA IN WHICH SHOOTING PROCESS MODE IS CHANGED VIA THE SHUTTER RELEASE BUTTON

(75) Inventor: Hiroshi Sagiya, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 827 days.

(21) Appl. No.: 10/348,173

(22) Filed: Jan. 22, 2003

(65) Prior Publication Data

US 2003/0137591 A1 Jul. 24, 2003

(30) Foreign Application Priority Data

Jan. 22, 2002 (JP) ............................. 2002-012867

(51) Int. Cl.
H04N 5/235 (2006.01)

(52) U.S. Cl. ...................................... 348/362; 348/345

(58) Field of Classification Search ........... 348/207.99, 348/222.1, 241, 345, 362; 396/48, 263, 502
See application file for complete search history.

(56) References Cited

U.S. PATENT DOCUMENTS

| | | | | |
|---|---|---|---|---|
| 6,697,568 B1 * | 2/2004 | Kaku | ......................... | 386/117 |
| 6,734,910 B1 * | 5/2004 | Yumoto et al. | ........ | 348/333.12 |
| 2001/0043279 A1 * | 11/2001 | Niikawa et al. | ............ | 348/335 |
| 2003/0117505 A1 * | 6/2003 | Sasaki et al. | .......... | 348/231.99 |

FOREIGN PATENT DOCUMENTS

| | | | |
|---|---|---|---|
| JP | 09080610 A | * | 3/1997 |
| JP | 11-177866 A | | 7/1999 |
| JP | 11-305293 A | | 11/1999 |
| JP | 2001-136417 A | | 5/2001 |
| JP | 2001-148805 A | | 5/2001 |
| JP | 2001-359038 A | | 12/2001 |

* cited by examiner

*Primary Examiner*—Lin Ye
*Assistant Examiner*—Timothy J Henn
(74) *Attorney, Agent, or Firm*—Birch, Stewart, Kolasch & Birch, LLP.

(57) ABSTRACT

One objective of the present invention is to provide a digital camera wherein a shooting process mode can be set easily in a short period of time. The digital camera includes a lens, an image pickup device, a driver, an analog signal processor, an A/D converter, a digital signal processor, an output memory, a compressor/decompressor, a system controller, a media interface, an image monitor, and an operation unit including a shutter release button. The operating condition signal of the shutter release button, of a two-stage stroke type, is transmitted to the system controller, the halfway-pressed period is detected by a halfway-pressed period measuring unit, and the shooting process mode consonant with the halfway-pressed period is determined by a shooting process mode determination unit. Under the control of the system controller, the shooing process is performed in the determined shooting process mode.

5 Claims, 6 Drawing Sheets

| SELECTION SWITCH MODE | HALFWAY-PRESSED PERIOD | NOISE REMOVAL PROCESS | EXPOSURE CONTROL | NUMBER OF RECORDING PIXELS |
|---|---|---|---|---|
| MULTIPLE-STAGE MODE A | EXTREMELY SHORT | NO | PROGRAM | SMALL IN NUMBER |
| | SHORT | * | PREFERENCE SHUTTER | * |
| | LONG | * | PREFERENCE APERTURE | * |
| | EXTREMELY LONG | YES | PROGRAM | LARGE IN NUMBER |
| MULTIPLE-STAGE MODE B | EXTREMELY SHORT | NO | PROGRAM | SMALL IN NUMBER |
| | SHORT | NO | PREFERENCE SHUTTER | SMALL IN NUMBER |
| | LONG | * | PREFERENCE APERTURE | * |
| | EXTREMELY LONG | YES | PREFERENCE APERTURE | LARGE IN NUMBER |

*: ACCORDING TO MANUAL SETUP

FIG. 3

| | SELECTION SWITCH MODE | HALFWAY-PRESSED PERIOD | NOISE REMOVAL PROCESS | EXPOSURE CONTROL | NUMBER OF RECORDING PIXELS |
|---|---|---|---|---|---|
| ① | SELECTION OF RECORDING SPEED | SHORT | NO | PROGRAM | LARGE IN NUMBER |
| | | LONG | YES | PROGRAM | * |
| ② | SELECTION OF EXPOSURE CONTROL | SHORT | * | PREFERENCE SHUTTER | * |
| | | LONG | * | PREFERENCE APERTURE | * |
| ③ | SELECTION OF NUMBER OF RECORDING PIXELS | SHORT | NO | PROGRAM | SMALL IN NUMBER |
| | | LONG | * | PROGRAM | LARGE IN NUMBER |
| ④ | COMBINATION A | SHORT | NO | PREFERENCE SHUTTER | SMALL IN NUMBER |
| | | LONG | YES | PREFERENCE APERTURE | LARGE IN NUMBER |
| ⑤ | COMBINATION B | SHORT | NO | PREFERENCE SHUTTER | SMALL IN NUMBER |
| | | LONG | YES | PREFERENCE APERTURE | * |

*: ACCORDING TO MANUAL SETUP

FIG. 4

| SELECTION SWITCH MODE | HALFWAY-PRESSED PERIOD | NOISE REMOVAL PROCESS | EXPOSURE CONTROL | NUMBER OF RECORDING PIXELS |
|---|---|---|---|---|
| MULTIPLE-STAGE MODE A | EXTREMELY SHORT | NO | PROGRAM | SMALL IN NUMBER |
| | SHORT | * | PREFERENCE SHUTTER | * |
| | LONG | * | PREFERENCE APERTURE | * |
| | EXTREMELY LONG | YES | PROGRAM | LARGE IN NUMBER |
| MULTIPLE-STAGE MODE B | EXTREMELY SHORT | NO | PROGRAM | SMALL IN NUMBER |
| | SHORT | NO | PREFERENCE SHUTTER | SMALL IN NUMBER |
| | LONG | * | PREFERENCE APERTURE | * |
| | EXTREMELY LONG | YES | PREFERENCE APERTURE | LARGE IN NUMBER |

*: ACCORDING TO MANUAL SETUP

FIG. 6

DIGITAL CAMERA IN WHICH SHOOTING PROCESS MODE IS CHANGED VIA THE SHUTTER RELEASE BUTTON

BACKGROUND OF THE INVENTION

1. Field of the Invention

The present invention relates to a digital camera having a two-stage stroke type shutter release button.

2. Description of the Related Art

Generally, a variety of modes can be set for picking up an image with a camera. The modes set are ones associated with a shooting method, such as the selection of either a static image for each picture or for sequential pictures, and ones associated with shooting conditions, such as exposure control, focusing point control or the need for supplementary, auxiliary lighting. These modes may be independently set or a number of them may be combined and set. Further, in addition to directly designating shooting methods or shooting conditions, some modes are set simply by designating the objects that are to be shot, which may include landscape scenes, sports events, portraits, night scenes and macros.

Furthermore, in addition to the conventional modes employed for a so-called digital camera that acquires image data as electronic data, a mode is set that is associated with the method for processing image data obtained by image pickup means. The typical methods that are set for processing image data are the need of a noise removal process, the selection of the number of pixels for an image to be processed and the number of pixels to be recorded, and the selection of a compression method for data recording. These image processing methods can be set simply by designating an object that is to be shot. In most cases, a plurality of modes, including those for the shooting methods and the shooting conditions, are combined and selected by designating the object that is to be shot.

As is described above, since modes such as shooting methods and shooting conditions for obtaining image data and modes for image processing methods are set for digital cameras, consonant with the purposes and the objects to be shot, optimal images can be obtained. Further, in order to simplify the setup operation, consonant with the purposes and the objects to be shot, sets of shooting methods, shooting conditions and image processing methods are prepared.

An operation button or an operation dial must be manipulated to set a shooting method, shooting conditions and image processing methods, or to change the selection of a combination of them. However, since many entries that can be changed are provided for a digital camera because multi-functions have been requested, a user tends to perform the setup operation on the monitor screen. Consequently, it is actually difficult to change a setup during a shooting session.

Another request is for a camera to have a function whereby a user can take an image of the same object using different shooting process modes by sequentially changing setup entries, such as the shooting condition, while holding the camera. One further request is that an user be able to easily switch between shooting process modes that are frequently employed.

SUMMARY OF THE INVENTION

To resolve these shortcomings, it is one objective of the present invention to provide a digital camera for is which the setting of a shooting process mode can be performed quickly and easily.

According to the present invention, a digital camera having a two-stage stroke type shutter release button includes: timing means for measuring a halfway-pressed period, which is a period between a point whereat the initial condition of the shutter release button is shifted to a halfway-pressed condition and a point whereat the halfway-pressed condition is shifted to a completely pressed condition; and shooting process mode determination means for determining a shooting process mode in accordance with the halfway-pressed period obtained by the timing means. With this configuration, simply by manipulating the shutter release button, a user can change the shooting process mode while using a viewfinder. Accordingly, the usability is improved.

According to the digital camera of the invention, the shooting process mode, determined in accordance with the halfway-pressed period, can be arbitrarily set. With this arrangement, the user of a digital camera can easily pickup an image using a shooting process mode consonant with the existing circumstances.

According to the invention, the digital camera further comprises: shutter release button halfway-pressed count detection means for detecting the number of halfway-press, representing the number of times the initial condition of the shutter release button was shifted to the halfway-pressed condition, during a predetermined period of time; wherein the shooting process mode determination means determines the shooting process mode in accordance with the halfway-pressed period obtained by the timing means and the number of halfway-press obtained by the shutter release button halfway-pressed count detection means. With this configuration, many more shooting process modes can be easily set within a short period of time.

According to the digital camera of the invention, the shooting process mode determined in accordance with the halfway-pressed period and the halfway-press count can be discretionary set.

According to the digital camera of the invention, the shooting process mode determined by the shooting process mode determination means includes image data acquisition mode for specifying a method for obtaining image data using the image pickup means.

According to the digital camera of the invention, the image data acquisition mode includes an aperture-preference exposure control mode, a shutter-preference exposure control mode, a macro shooting process mode and a sequential shooting process mode.

According to the digital camera of the invention, the shooting process mode determined by the shooting process mode determination means includes an image processing mode for specifying an image processing method to be used for image data obtained by the digital camera.

According to the digital camera of the invention, the image processing mode includes a mode for designating the need for a noise removal process and a mode for specifying the number of recording pixels.

According to the digital camera of the invention, the shooting process mode determination means determines at the same time multiple modes included in the image data acquisition mode or the image processing mode. With this arrangement, a user of the digital camera can easily take an image using a shooting process mode that is consonant with his or her shooting pattern.

According to the digital camera of the invention, a combination of modes determined by the shooting process mode determination means can be arbitrarily set. With this arrangement, the user of a digital camera can easily take an image using a shooting process mode consonant with his or her shooing pattern.

According to the invention, the digital camera further includes: an operation unit for validating or invalidating the function of the shooting process mode determination means.

In the figures, the reference numeral 1 refers to a lens; 2 to an image pickup device; 3 to a driver; 4 to an analog signal processor; 5 to an A/D converter; 6 to a digital signal processor; 7 to an output memory; 8: a compressor/decompressor; 9 to a system controller; 10 to a media interface; 11 to an image monitor; 12 to an operation unit; 13 to a shutter release button; 61 to a pre-processor; 62 to a noise removal process; 91 to a shooting process mode determination unit; 92 to an halfway-pressed period measuring unit; and 93 to an halfway-press count detector.

DETAILED DESCRIPTION OF THE PREFERRED EMBODIMENTS

Figure 1:
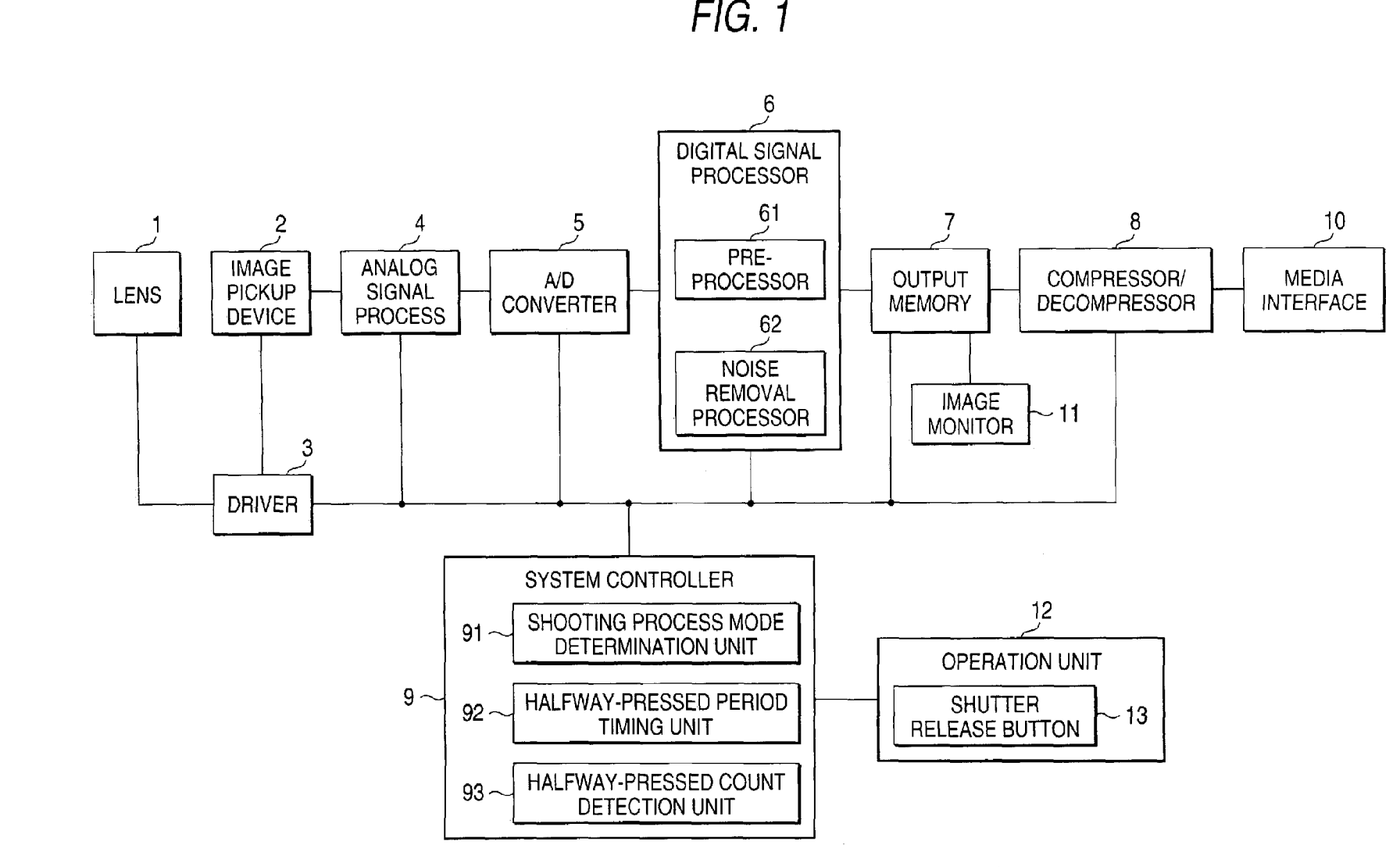
FIG. 1 is a schematic diagram showing the configuration of a digital camera according to the present invention.

The preferred embodiment of the present invention will now be described while referring to the accompanying drawings. FIG. 1 is a schematic diagram showing the configuration of a digital camera according to the present invention. The digital camera in FIG. 1 comprises: an image pickup unit, including a lens 1, an image pickup device 2 and a driver 3; a signal processing unit, including an analog signal processor 4, an A/D converter 5, a digital signal processor 6, an output memory 7 and a compressor/decompressor 8; an output unit, including a media interface 10 and an image monitor 11; an operation unit 12, including a shutter release button 13; and a system controller 9 that provides overall control for the digital camera.

Since the image pickup unit and the signal processing unit are the same as conventional units, they will be described only briefly. Light passing through the lens 1 is focused at the image pickup device 2, such as a CCD, and an image signal is obtained by using the driver 3 to control the lens 1 and an aperture (not shown). In response to the completely-pressed of the shutter release button 13, employed as a trigger, the image pickup device 2 is driven at a predetermined timing by the driver 3, including a timing generator (not shown), and outputs an image signal.

The image signal is changed into an analog signal by the analog signal processor 3, the analog signal is converted into a digital signal by the A/D converter 5, and the digital signal is temporarily stored in the output memory 7 through the digital signal processing performed by the digital signal processor 6. The processes performed by the digital signal processor 6 include a pre-process 61, such as white balance adjustment, the Y/C process or γ correction, and a noise removal process 62 performed to obtain an image having a high quality. When an image is to be displayed on an image monitor 11 based on the image data obtained through the digital image processing, the contents in the output memory 7 are read and transmitted to the image monitor 11. The image data in the output memory 7 are compressed by the compressor/decompressor 8, and the compressed image data are transmitted through the media interface 10 and stored on a recording medium, such as a memory card (not shown).

When an image based on image data stored on the recording medium is to be displayed on the image monitor 11, image data read from the recording medium are decompressed by the compressor/decompressor 8, written to the output memory 7 and transmitted to the image monitor 11.

These operations are performed under the control of the system controller 9, in accordance with an operation signal transmitted by the operation unit 12 that includes the shutter release button 13. The system controller 9 includes a shooting process mode determination unit 91, a halfway-pressed period measuring unit 92 and a halfway-press count detector 93, all of which may be used, in accordance with the manipulation of the shutter release button 13, to determine the shooting process mode of the digital camera, although the halfway-press count detector 93 may not be provided. The operation performed to determine the shooting process mode will be described later. The system controller 9 is constituted mainly by a processor, which is operated by a predetermined program, while a program, a memory for storing various data required for the operation and a work memory are internally provided.

When the digital camera is employed, the operation unit 12 is used to perform various operations, such as the setting of the shooting method, the shooting condition and the method for processing the image data, and to enter instructions for image data recorded on a recording medium, including a display instruction or an instruction for the addition of information. Operation members corresponding to the individual functions may be provided for the operation unit 12, or an operation member may be employed in common that interacts with the display of the image monitor 11. The shutter release button 13, which is mainly used to instruct the execution of the shooting sequence, is a two-stage stroke type, and at the least, transmits to the system controller 9 a signal indicating the condition wherein the shutter release button 13 is pressed halfway down and a signal indicating the condition wherein the shutter release button 13 is completely pressed. Therefore, the system controller 9 can identify the three conditions of the shutter release button 13, i.e., the initial condition, wherein the shutter release button 13 is not pressed, the halfway-pressed condition and the completely-pressed condition.

An explanation will now be given for the determination of the shooting process mode, including the shooting method, the shooting condition and the method for processing image data, in accordance with the condition of the shutter release button 13. When the operation unit 12 is employed to set the mode for changing the operation of the digital camera in accordance with a period during which the shutter release button 13 is pressed halfway down, the halfway-pressed period measuring unit 92 of the system controller 9 measures the time the shutter release button 13 is pressed halfway down.

Figure 2:
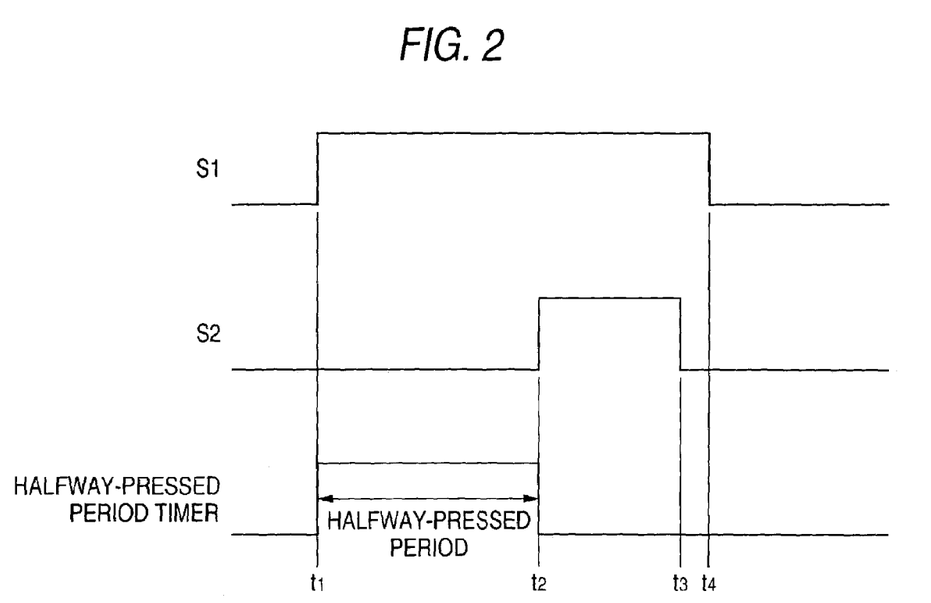
FIG. 2 is a time chart for explaining the operation of a halfway-pressed period measuring unit.

The operation of the halfway-pressed period measuring unit 92 will now be described while referring to the time chart in FIG. 2. The halfway-pressed period measuring unit 92, for which a halfway-pressed period timer (not shown) is provided, controls the operation of the halfway-pressed period timer based on two condition signals transmitted by the operation unit 12, i.e., a signal S1 indicating the halfway-pressed condition and a signal S2 indicating the completely-pressed condition. When at time $t_2$ the shutter release button 13 is pressed halfway down and the stroke is halted half way, the signal S1 goes "high" while the signal S2 remains "low", and in this halfway-pressed condition, the time count performed by the halfway-pressed period timer is begun. Then, when at time $t_1$ the shutter release button 13 is completely pressed, the signal S2 goes from "low" to "high", and in this completely-pressed condition, the time count performed by the halfway-pressed period timer is halted. Therefore, the value obtained by the halfway-pressed period timer represents the halfway-pressed period between the point $t_2$ whereat the initial condition of the shutter release button 113 is shifted to the halfway-pressed condition and the point $t_1$ whereat the halfway-pressed condition is shifted to the completely-pressed condition.

When the shutter release button 13 is completely pressed, based on the value held by the halfway-pressed period timer, the shooting process mode determination unit 91 of the system controller 9 determines the shooting process mode for the shooting method, the shooting condition and the method for processing image data, and the system controller 9 performs a shooting process consonant with the mode determined by the shooting process mode determination unit 91. The shooting method, the shooting condition and the method for processing the image data need not all be determined during the halfway-pressed period, and the determination of any that are not, should follow the setup using the operation unit 12. The value held by the halfway-pressed period timer is reset by detecting the change in the signal S1 from "high" to "low".

Figure 3:
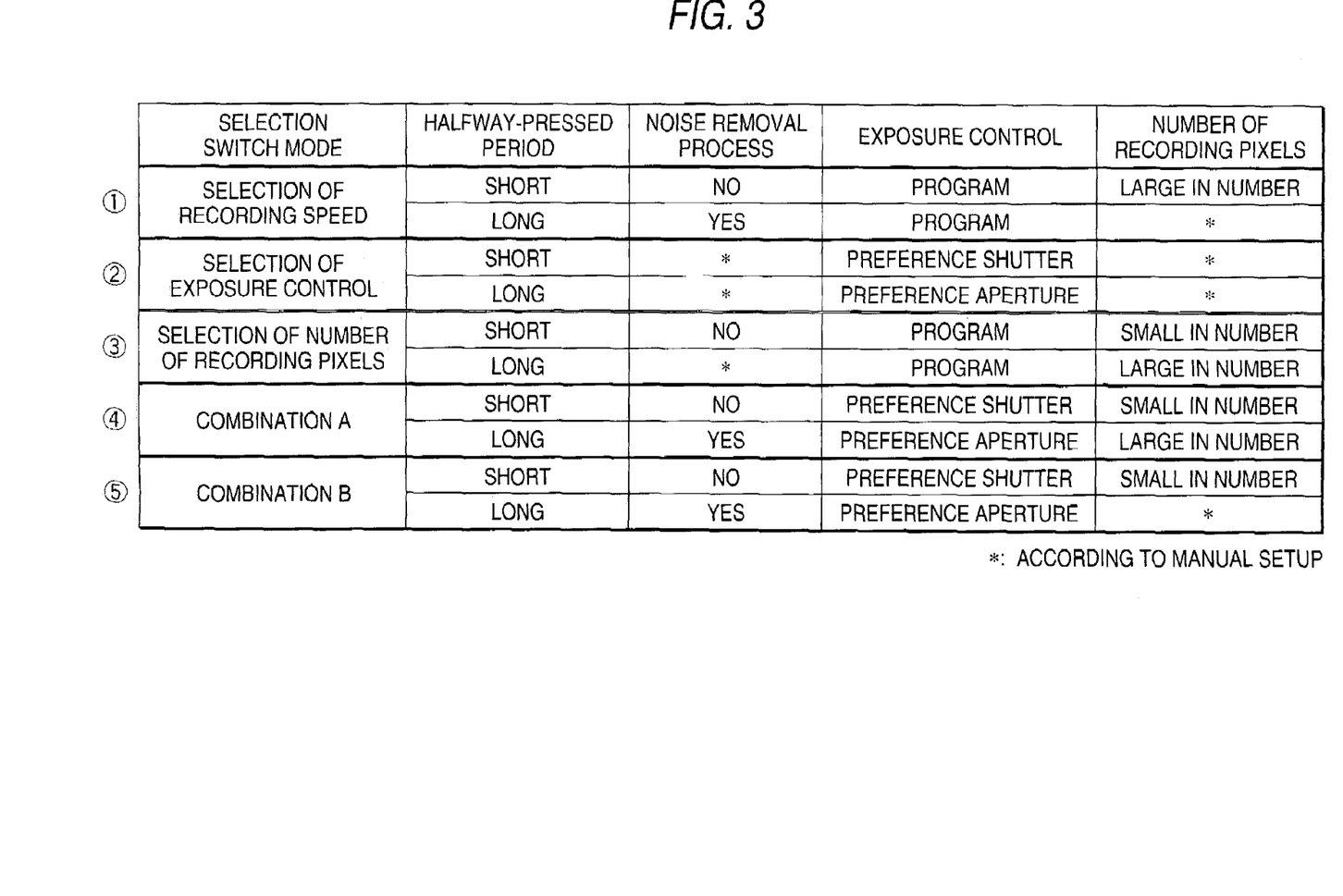
FIG. 3 is a diagram showing an example of shooting process modes determined in accordance with a halfway-pressed period.

Any shooting process mode may be determined in accordance with a halfway-pressed period of the shutter release button 13, and an arbitrary number of stages can be used for the periods employed when determining a mode. However, when the accuracy of the time identification of which a user is capable is taken into account, two to four period stages are appropriate. FIG. 3 is a diagram showing an example wherein two stages are used for the determination of a mode. In (1) in FIG. 3, the selection of a recording speed is shown. When the halfway-pressed period is short, the noise removal process is eliminated and a short programmed exposure time is selected to acquire an image rapidly, while a reduced number of recording pixels is set to shorten the image processing time. When the halfway-pressed period is long, the noise removal process is performed, on the assumption that a high quality image is desired, and a slightly extended exposure time is selected. The number of recording pixels is as set by a user. In (2) in FIG. 3, exposure control is selected. When the halfway-pressed period is short, preference is given to the shutter, on the assumption of picking up images of sports, and when the halfway-pressed period is long, preference is given to the aperture in order to obtain an image of a desired type. In (3) in FIG. 3, the number of recording pixels is selected. When the halfway-pressed period is short, a small number of recording pixels is set, and when the halfway-pressed period is long, a large number of recording pixels is set.

In (1), (2) and (3) in FIG. 3, only one entry is set (the shooting method, the shooting condition or the method for processing the image data) and is basically employed; however, multiple entries may be set at the same time. In (4) in FIG. 3, the fast shooting process mode and the accurate shooting process mode are switched. When the halfway-pressed period is short, the mode is set whereby all the entries are appropriate for the fast mode or the accurate mode, and when the halfway-pressed period is long, the mode selected is the one whereby an accurate image can be obtained. In (5) in FIG. 3, the same setup is applied, except that when the halfway-pressed period is long, only the number of recording pixels is set by the user.

Figure 4:
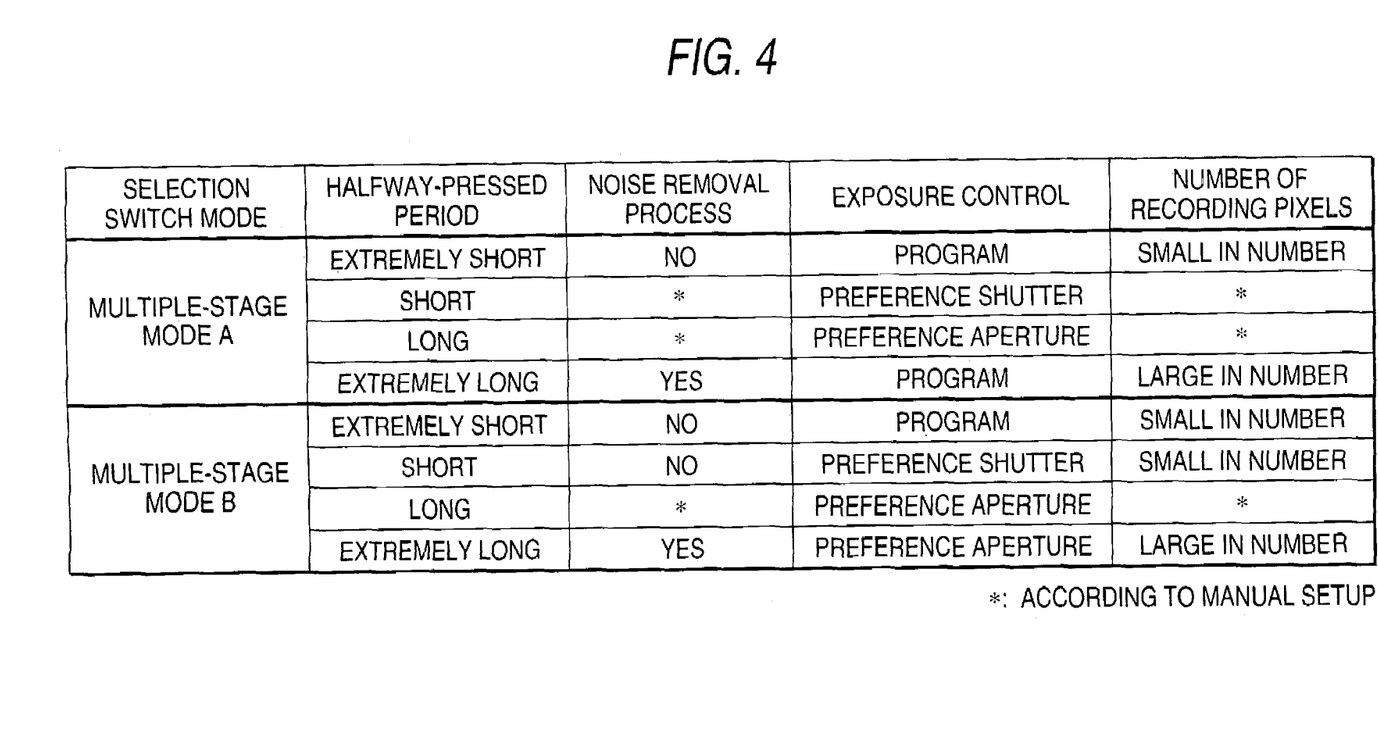
FIG. 4 is a diagram showing another example of shooting process modes determined in accordance with a halfway-pressed period.

FIG. 4 is a diagram showing an example wherein the halfway-pressed period is divided into four stages. In this case also, when the halfway-pressed period is short, the appropriate setup for rapid shooting is provided, and when the halfway-pressed period is long, the appropriate setup for high-resolution shooting is provided. In the example in FIG. 4, while the requirement for the noise removal process and the selection of the number of recording pixels differ slightly for the multi-stage modes A and B, beginning with the shortest halfway-pressed period, the mode for as rapid as possible shooting, the mode appropriate for sports, the mode appropriate for portrait picture and the mode for high-quality picture are provided for the stages of these modes A and B.

The entries and contents set in accordance with a halfway-pressed period can be selected as needed. When the selection modes in FIGS. 3 and 4, or the typical modes for them are set as defaults, as the remaining modes, the user may set selection modes consonant with his or her shooting pattern. When before beginning to shoot the user employs the operation unit 12 to select the selection switch mode, the shooting process mode consonant with the existing circumstances can be set. Further, the function for determining the shooting process mode in accordance with the halfway-pressed period of the shutter release button 13 is validated and employed, as needed, by manipulating the operation unit 12.

Figure 5:
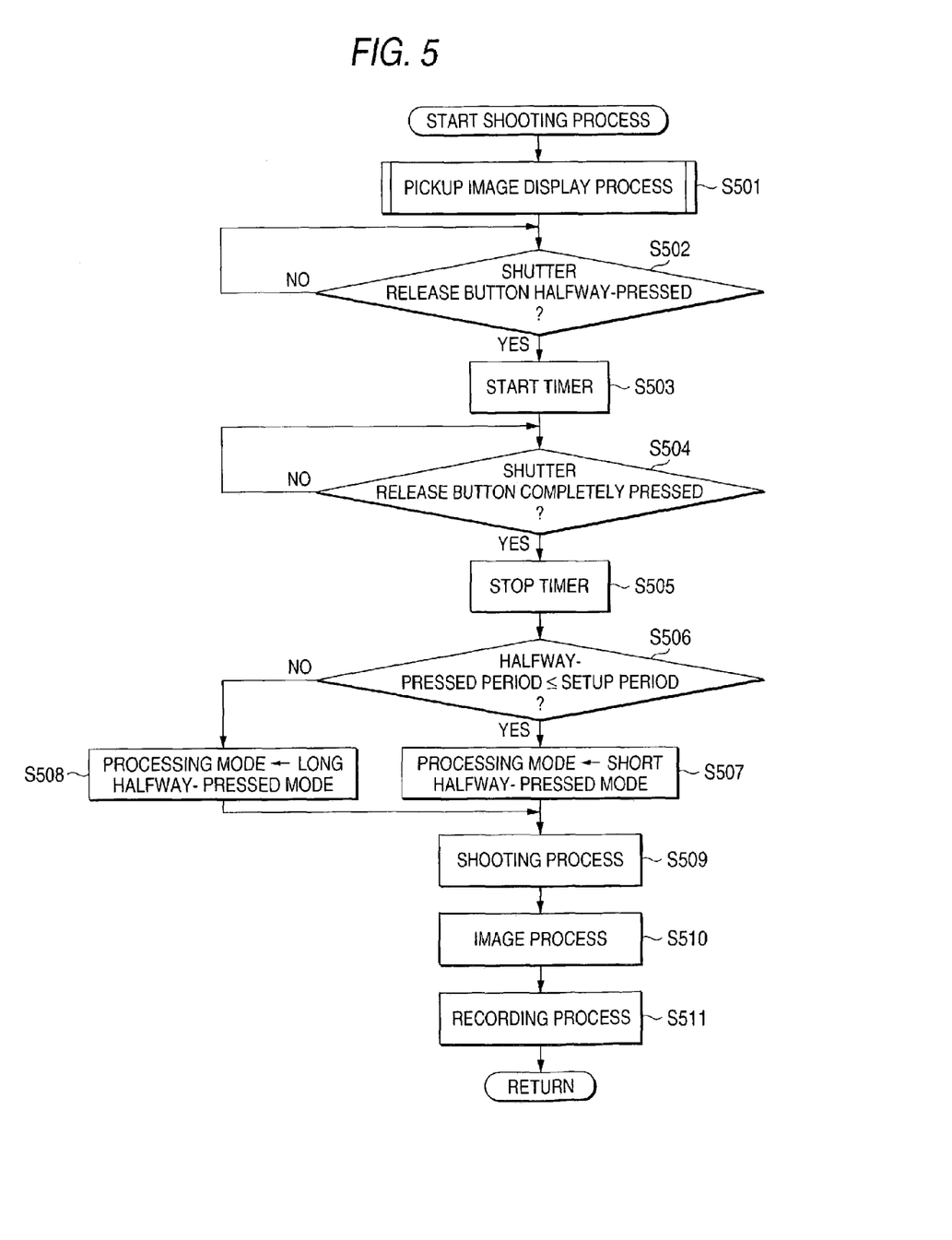
FIG. 5 is a schematic flowchart showing the shooting process performed by the digital camera.

FIG. 5 is a schematic flowchart for the shooting operation performed by the digital camera of the invention. In this example, it is assumed that the function for determining the shooting process mode in accordance with the halfway-pressed period of the shutter release button 13 has been validated. In the shooting process mode, the digital camera performs the image display process for displaying an image on the image monitor 11 (step 501). Since this display process is the same as the one for the conventional process, no further explanation for it will be given.

When at step 502 the halfway-press of the shutter release button 13 is detected, the halfway-pressed period timer of the halfway-pressed period measuring unit 92 begins the time counting process (step 503). And when at step 504 the completely-press of the shutter release button 13 is detected, the halfway-pressed period timer halts the time counting process (step 505). Then, at step 506 the length of the halfway-pressed period, obtained by the halfway-pressed period timer, is compared with that of a period designated in advance, and when the halfway-pressed period is equal to or shorter than the designated period, the mode for the short halfway-pressed period is defined as the shooting process mode (step 507). When the halfway-pressed period is longer than the setup period, the mode for the long halfway-pressed period is defined as the shooting process mode (step 508). When the halfway-pressed period is divided into three or more stages, the stage of the halfway-pressed period is determined and the shooting process mode is defined by comparing the halfway-pressed period with multiple setup periods at step 506. The setup period for determining the stage of a halfway-pressed period may be changed by the user with the operation unit 12.

Next, under the control of the system controller 9, the digital camera performs the shooting process in the defined shooting process mode (step 509), the image processing based on the obtained image signal (step 510) and the process for recording the image data (step 511). When the halfway-pressed period is short and the recording speed selection mode (1) in FIG. 2 is set, the exposure is performed using a value programmed in advance, and the shooting process for which the noise removal process was eliminated is performed for a small number of recording pixels. The entries, other than those determined in accordance with the halfway-pressed period, are those already set by the operation unit 12.

An explanation has been given for the digital camera that determines a shooting process mode in accordance with a halfway-pressed period obtained by the halfway-pressed period measuring unit 92 in the system controller 9. However, as is shown in FIG. 1, the halfway-press count detector 93 may also be provided for detecting the number of halfway-press, that is, the number of times the initial condition of the shutter release button 13 is shifted to the halfway-pressed condition, during a predetermined period of time, and the shooting process mode may be determined in accordance with the halfway-pressed period and the number of halfway-press.

Figure 6:
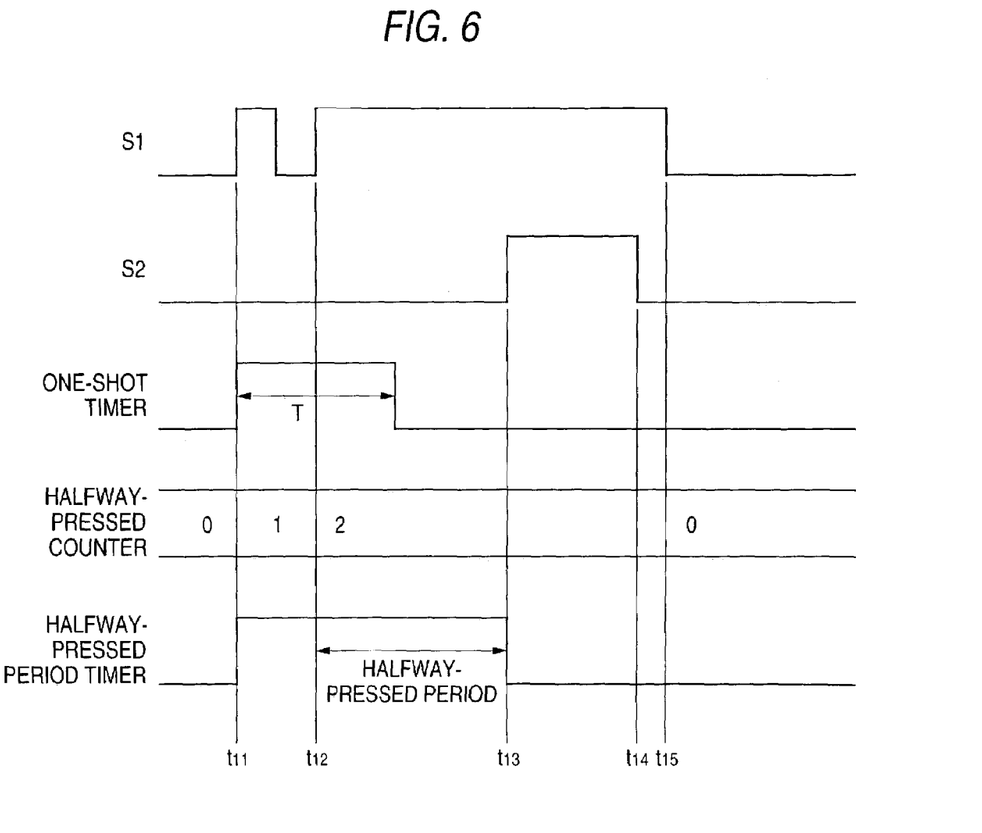
FIG. 6 is a time chart for explaining the operation of a halfway-press count detector.

The operation of the halfway-press count detector 93 will now be described while referring to the time chart in FIG. 6. The halfway-press count detector 93 includes a halfway-press counter and a one-shot timer (neither of them shown), and detects the number of halfway-press based on the signals S1 and S2 used by the halfway-pressed period measuring unit 92. The halfway-press counter detects the times whereat the shutter release button 13 is pressed halfway down during a period defined by the one-shot timer. The count value is incremented when the signal S1 is changed from "low" to "high", and when the signal S1 is changed from "high" to "low", while the one-shot timer is not being operated, the counter value is reset. The one-shot timer, which generates the reference period for counting the halfway-press, is changed from "low" to "high" when the signal S1 is changed from "low" to "high", and is then changed to "low" after a predetermined time period T has elapsed.

When at time $t_{11}$ the shutter release button 13 is pressed halfway down and is halted halfway, the signal S1 is changed to "high" while the signal S2 is maintained "low". At this time, the one-shot timer is changed from "low" to "high", and the halfway-press counter increments its retained value to "1". Then, when the shutter release button 13 is returned to the initial condition and is again pressed halfway down at time $t_{12}$, the halfway-press counter increments its retained value to "2". Thereafter, when at time $t_{13}$ the shutter release button 13 is completely pressed, the signal S2 is changed from "low" to "high", the halfway-pressed period timer of the halfway-pressed period measuring unit 92 halts the count, and the shooting process mode determination unit 91 determines the shooting process mode based on the halfway-pressed period obtained by the halfway-pressed period timer and the count of the halfway-press obtained by the halfway-press counter. Subsequently, when the signal S1 is changed to "low" at time $t_{15}$, the halfway-press counter is reset. Since the halfway-pressed period timer of the halfway-pressed period measuring unit 92 restarts the time count when the signal S1 is changed from "low" to "high", the halfway-pressed period is the period extending from time $t_{12}$ to time $t_{13}$.

When in this manner the halfway-pressed period and the number of halfway-press of the shutter release button 13 are employed to determine the shooting process mode, many more shooting process modes can be easily determined during a short period of time. The number of halfway-press is employed to set the macro shooting process mode and to shift the mode to shooting for which auxiliary light is used, and when the mode is thereafter changed in accordance with the halfway-pressed period, many shooting process modes can be selected.

As is apparent from this explanation, according to the invention, a digital camera can be provided for which shooting process modes can be easily set within a short period of time. Therefore, a user can pickup images using the shooting process modes appropriate to his or her shooting pattern, and the usability of the camera is improved.

What is claimed is:

1. A digital camera having a two-stage stroke type shutter release button comprising:
   timing means for timing a halfway-pressed period, which is a period between a point of time when the shutter release button in initial condition is pressed halfway down and a point of time when said shutter release button in halfway pressed condition is pressed completely down;
   shooting process mode determination means for determining a shooting process mode in accordance with said halfway-pressed period obtained by said timing means; and
   shutter release button halfway-pressed count detection means for detecting a number of halfway-press, representing the number of times said initial condition of said shutter release button was shifted to said halfway-pressed condition, during a predetermined period of time,
   wherein said shooting process mode determination means determines said shooting process mode in accordance with said halfway-pressed period obtained by said timing means and said number of halfway-press obtained by said shutter release button halfway-pressed count detection means.

2. The digital camera according to claim 1,
   wherein said shooting process mode determined in accordance with said halfway-pressed period and said number of halfway-press is discretionary set.

3. A digital camera having a two-stage stroke type shutter release button comprising:
   timing means for timing a halfway-pressed period, which is a period between a point of time when the shutter release button in initial condition is pressed halfway down and a point of time when said shutter release button in halfway pressed condition is pressed completely down; and
   shooting process mode determination means for determining a shooting process mode in accordance with said halfway-pressed period obtained by said timing means,
   wherein said shooting process mode determined by said shooting process mode determination means includes an image processing mode for specifying an image processing method to be used for image data obtained by said digital camera.

4. The digital camera according to claim 3,
   wherein said image processing mode includes a mode for designating the need for a noise removal process.

5. The digital camera according to claim 3,
   wherein said image processing mode includes a mode for specifying the number of recording pixels.

* * * * *